A. L. HAHL.
TRANSMISSION MECHANISM FOR CLOCKS.
APPLICATION FILED MAY 21, 1915.

1,300,262.

Patented Apr. 15, 1919.
2 SHEETS—SHEET 1.

Witnesses:
C. D. Burnap

Inventor
Augustus L. Hahl
By
Sheridan, Wilkinson & Scott, Att'ys

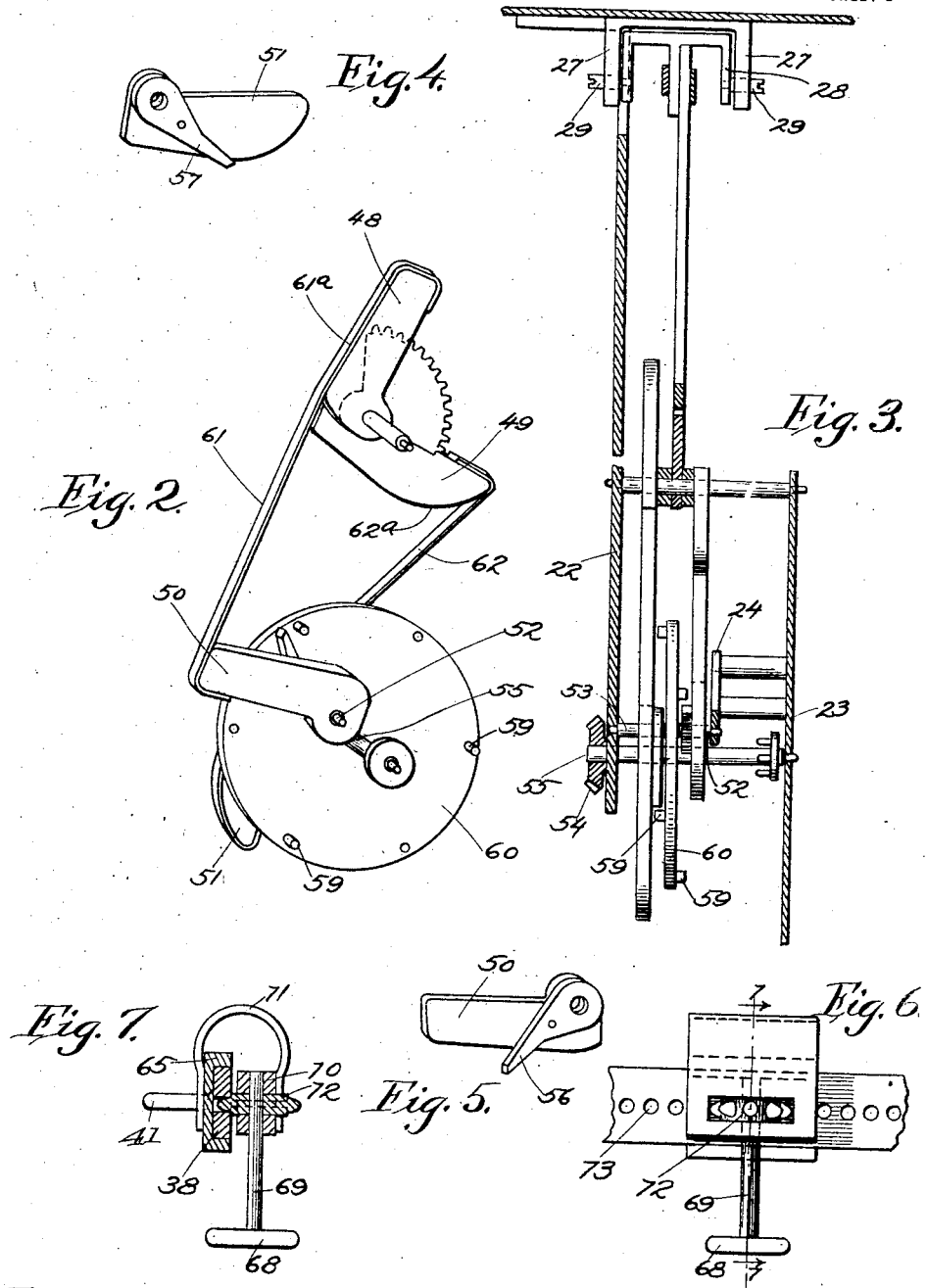

UNITED STATES PATENT OFFICE.

AUGUSTUS L. HAHL, OF CHICAGO, ILLINOIS.

TRANSMISSION MECHANISM FOR CLOCKS.

1,300,262.    Specification of Letters Patent.    Patented Apr. 15, 1919.

Application filed May 21, 1915. Serial No. 29,526.

*To all whom it may concern:*

Be it known that I, AUGUSTUS L. HAHL, a citizen of the United States, residing at Chicago, in the county of Cook and State of Illinois, have invented certain new and useful Improvements in Transmission Mechanism for Clocks, of which the following is a specification.

This invention relates to transmission mechanism for clocks, and is intended as an improvement upon the corresponding mechanism shown and described in my prior Patent No. 1,098,494, granted June 2, 1914.

The purpose of the invention is to provide a transmitting mechanism which may be employed with advantage in clock construction for transmitting power from a motor train to a suitable receiving device or mechanism. My apparatus is particularly adapted for use in the construction and operation of master clocks of pneumatic time systems.

As explained in my prior patent, above referred to, the air displacing mechanism of the earlier forms of master clocks was subjected to an increasing resistance, owing to the compression of the air, and other causes, which resistance was a maximum at the end of each operation, and where a uniform driving power was employed a sluggish and uncertain action, as well as a great waste of power, resulted. A further disadvantage was that a leakage of air in the system occasionally caused a partial vacuum, which still further increased the resistance and frequently caused a complete stoppage of the actuating mechanism. These difficulties were remedied in the device of my prior patent by employing transmission mechanism by means of which the driving power is enabled to actuate the air-displacing mechanism with an increasing mechanical advantage or leverage substantially proportional to the increasing resistance. This transmission mechanism described in my prior patent comprises levers which are actuated by toothed cams or star-wheels, in which the leverage is made to vary progressively in a manner substantially proportional to the increasing resistance. A uniform driving power is thereby enabled to overcome the higher resistance of the compressed air with the same facility that it overcomes the resistance at starting. A saving in driving power is thereby effected, and uncertainties in operation are avoided.

My present invention provides a device which operates in a somewhat similar manner, and which possesses similar but increased advantages. Instead of actuating the bellows-levers, which have only a limited movement, directly by the star-wheels and alternating step-lugs, as in my prior device above referred to, I interpose an intermediate member which carries curved arms or cams similar to the driving arms of the motor, and these arms of the intermediate member are so constructed and arranged as to be capable of traversing a much larger path of movement than the bellows-levers do. Thus the paths of the cams or arms of the intermediate member can be relatively long so as to produce a gradual positive change of leverage during the operation, thereby effecting an increasing mechanical advantage with a uniform driving power, while at the same time maintaining the desired limited movements of the bellows-levers because of the nature of the intermediate connections. A smoother and more perfect action of the transmitting mechanism and of the bellows is thereby produced. The amount of lost motion and friction is also reduced as compared with my prior device, and a still further lessening of the necessary power is effected.

A further feature of the invention relates to improved means for varying the strokes of the bellows-levers. Still another object is to provide means for permitting the operation of the motor train to continue until it is completed, even though a leak has occurred which causes a great resistance to said operation.

These and other features and objects of the invention will appear more clearly from the following specification, taken in connection with the accompanying drawings, in which one embodiment of the invention is illustrated.

In the drawings—

Fig. 2 is a perspective view of the connections between the driving shaft and the intermediate member.

Fig. 3 is a sectional view, taken along the line 3—3 of Fig. 1 showing certain parts of the mechanism in elevation.

Fig. 4 is a perspective view of one of the cam arms through which motion is transmitted to the intermediate member.

Fig. 5 is a perspective view of another cam arm through which motion is transmitted to the intermediate member.

Fig. 6 is a side elevation of the means for forming an adjustable connection between a bellows-lever and the actuating arm; and Fig. 7 is a sectional view, taken along the line 7—7 of Fig. 6.

Figure 1:
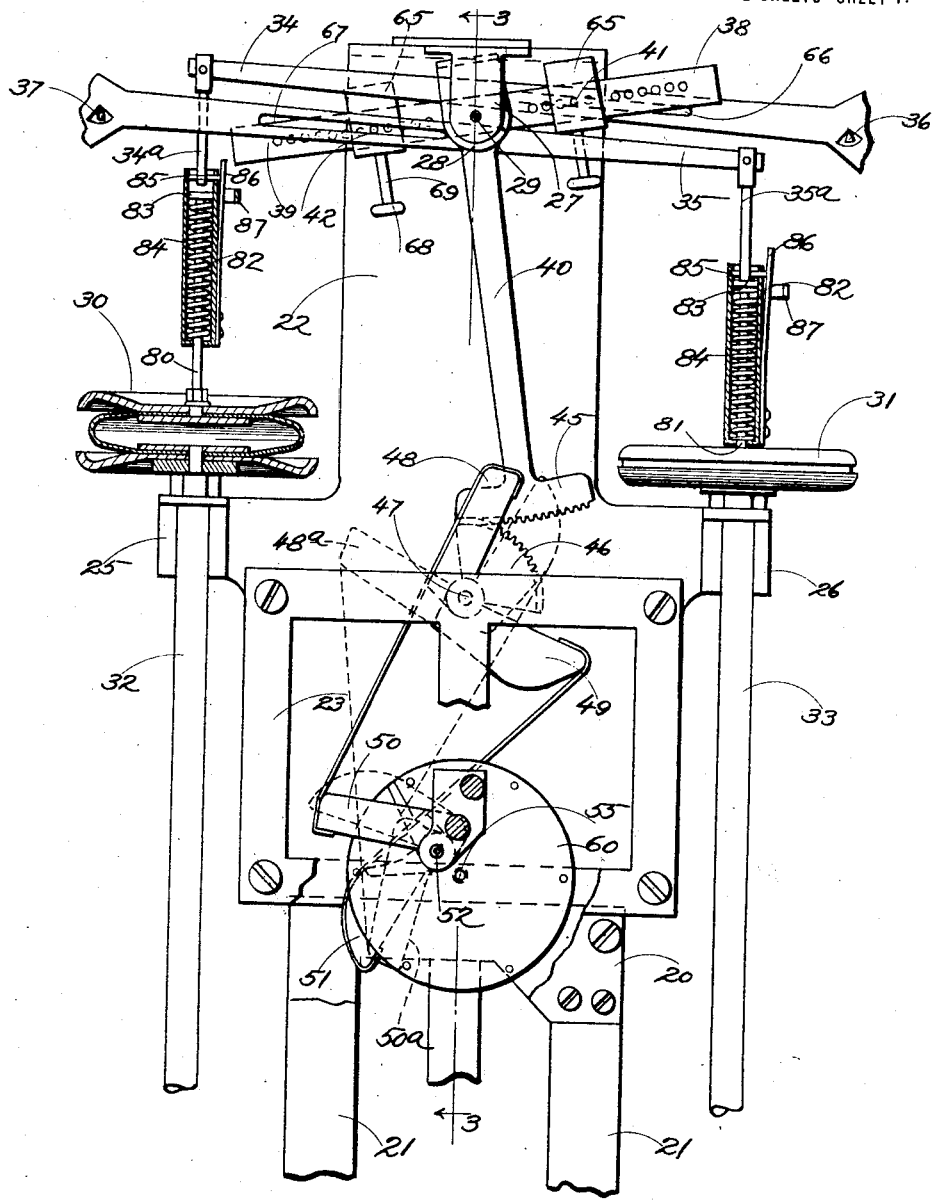
Figure 1 is a side elevation, partly in section, of my improved transmission mechanism.

The frame by means of which my improved mechanism is supported comprises a lower frame member 20, which is supported on legs or colums 21 and which carries an upper frame member or plate 22, having secured thereto and spaced therefrom the frame member 23. An additional frame member or bracket 24 is carried by the member 23 and spaced between said member and the member 22. The plate 22 carries at its upper end the downwardly projecting lugs 27, between which is mounted the yoke 28, supported on pivots 29.

My transmission mechanism is adapted for use in transmitting motion to the two air-displacing devices or bellows 30 and 31, which are mounted upon the main frame and adapted to operate alternately. The said bellows are connected, respectively, to the conduits 32 and 33 of the time system, carried by the projections 25 and 26, respectively, of the frame member 22, each of said conduits leading to a series of secondary clocks, as is well known in the art. The bellows 30 and 31 are actuated by levers 34 and 35, respectively, to which they are pivotally attached by means of the connecting members 34ª and 35ª. Said levers are mounted upon the knife-edge bearings 36 and 37, respectively, and are actuated by a single oscillating lever 40 having two horizontal right-angularly disposed arms 38 and 39, said arms being pivotally attached to the levers 34 and 35, respectively, by the pins 41 and 42. These pins are adjustably mounted and work in the levers, as will be described later. The oscillatory lever 40 and its arms 38 and 39 are attached to the yoke 28, which is pivotally mounted on the lugs 27, as above described.

At the lower extremity of the lever 40 is a segmental gear 45, which meshes with and is driven by the intermediate segmental gear 46 of smaller radius fixed upon the shaft 47. Said shaft is rotatably mounted in the frame 22, 23, and carries arms 48 and 49 fixed thereon, said arms having a certain form for receiving a variable driving force through flexible bands as described below.

Similar arms 50 and 51 are mounted upon stub shafts 52 and 53, respectively, fixed to the frame members 24 and 22, respectively. The said stub shafts are disposed in a position eccentric to a drive shaft 55, which is mounted in the framework and which is actuated through a gear 54, for instance, by a suitable driving motor. Secured to the inner faces of said arms 50 and 51 are cams or trips 56 and 57, adapted to receive the pressure of a series of pins 59 on the disk 60 fixed to the drive shaft 55. The eccentric mounting of the stub shafts 52 and 53 with relation to the shaft 55 causes said pins to make contact with said cams or trips during a small portion only of a revolution of the disk 60. The pins 59 project in opposite directions alternately from the disk 60, and therefore engage the trips or cams alternately, and cause the arms attached to them to oscillate through a certain angular space alternately. The arms 50 and 51 are connected with the arms 48 and 49, respectively, by flexible members 61 and 62. The ends of said bands are secured to the respective arms and are adapted to roll upon the curved, or specially formed, contour of said arms, as shown at 61ª and 62ª. These contours are of such a nature as will cause the oscillations of the arms 50 and 51 to be transmitted to the arms 48 and 49, respectively, at a greatly variable velocity.

It will be observed that when the arm 50 has an upwardly inclined position, as shown in Figs. 1 and 2, the flexible band 61 will leave said arm at a point which has a large radial distance from the axis of the arm's oscillatory movement. At the same time it will be observed that the said flexible band acts upon the arm 48 at a relatively small radius with respect to the axis of the oscillatory movement of said arm. When said arm 50 has moved to a downwardly inclined position, as is indicated by dotted lines 50ª, and the arm 48 has moved to its lower position, indicated by dotted lines 48ª, the conditions above described with relation to the radial action of the band 61 will be reversed. During the movement between the two extreme positions above described, the radial effect of the said band will vary greatly, from one of high speed and small mechanical advantage to one of low speed and great mechanical advantage. The return of said parts to their upper positions is effected by the somewhat similar pair of arms 51 and 49, which are connected by the other flexible band 62, as above described.

The arm 51 in like manner transmits power to the arm 49 during the downward oscillation of said arms. The arms 50 and 48, however, have somewhat different contours from the arms 51 and 49, for the reason that both the arms 50 and 51 lie on the same side of their pivotal supports, while the arms 48 and 49 lie on opposite sides of the shaft to which they are attached. This disposal of the arms causes a certain angular relation of the flexible bands, and necessitates the difference in the contours of said arms to maintain the same rate of motion between said arms.

The segmental gear 46, being fixed to the shaft 47, will be seen to move with the arms 48 and 49 alternately in opposite directions, and will impart similar oscillations to the segmental gear 45, and hence to the arm 40. In order to provide for variable strokes of the bellows 30 and 31, I provide an adjustable connection between the arms 38 and 39 and the levers 34 and 35, respectively. This adjustable connection comprises the blocks 65, which carry the pins 41 and 42, said blocks being slidably mounted upon the arms 38 and 39. The pins 41 and 42 are slidable in the slots 66 and 67 in the levers 34 and 35, respectively. In order to permit the blocks 65 to be conveniently moved along the arms 38 and 39, I provide each block with a hand wheel 68, carried by a stem 69, rotatably mounted in a small block 70, said small block, in turn, being flexibly attached to the block 65 by a spring 71. In each block is fitted a small toothed wheel 72, fixed to the corresponding stem, and the teeth of the wheel mesh with a series of holes 73 in the corresponding arm 38 or 39. It will be seen that a rotation of a hand wheel 68 will cause the corresponding block 65 to travel along the arm, and hence the pin 41 (or 42) will travel in the corresponding slot 66 or 67, and the relative lengths of the arms of each pair, 34, 38, and 35, 39, will be varied in the manner desired to bring about the variable strokes of the bellows.

In order to insure a complete operation of the motor train in each instance, even though a leak may have occurred to cause a great resistance to said operation, I provide a yielding connection between the levers 34 and 35 and the bellows 30 and 31, respectively. For this purpose each connecting member 34ª and 35ª comprises two rods 80 and 81, which are connected to the bellows and bellows-lever, respectively. A coil spring 82 is disposed around each rod 80, said rod being provided with a head 83 which bears upon one end of the spring and slides in a tubular element 84, which is secured at its upper end to the rod 81 by a pin 85, the pin being held in position by a flexible member 86 attached to the tubular member. The flexible member 86 may be bent to permit withdrawal of the pin, but is limited in its movement by the yoke 87, secured to the tubular element. By means of this connection the transmitting mechanism may be permitted to complete its operation, even though a leak has occurred which offers great resistance to a complete operation of the bellows.

In the operation of the device it will be understood that the shaft 55 is actuated through the gear 54 by a suitable motor, or other driving mechanism. The rotary motion of the shaft 55 causes the disk 60 and the pins 59 thereon to actuate the arms 50 and 51, which, in turn, through the flexible members 61 and 62, actuate the arms 48 and 49. Because of the varying relative radii of action of the driving and driven arms, increasing mechanical advantage is produced, which enables me to overcome the increasing resistance to the movement of the bellows during their operation. The resistance of the bellows increases greatly, and becomes excessive at the end of the operation, at which time in mechanism heretofore known stoppages have occurred. In my improved device this great resistance is easily overcome, and, further, should such resistance be so great as to prevent a complete operation of the bellows, the yielding connection between the bellows and the bellows-levers, above described, would permit a complete operation of the motor train and transmitting mechanism.

It will be understood that the oscillatory movement of the arms 48 and 49 is imparted to the shaft 47, to which is affixed the segmental gear 46, and which therefore partakes of the oscillatory movement. The oscillatory movement is transmitted by the gear 46, through the gear segment 45, to the arm 40, whose length is relatively great compared with the radius of the segmental gear 46. A relatively great angular movement of the shaft 47 and gear 46 thus produces a relatively limited angular movement of the bellows levers 34 and 35, which are actuated through the arms 38 and 39, respectively. The resulting reciprocatory movement of the upper members of the bellows 30 and 31 is correspondingly limited. The operations of the bellows, as above described, are made to occur at regular intervals by suitable controlling mechanism, such as that described in my prior Patent No. 1,098,495, of June 2, 1914, or as described in my co-pending application, Serial No. 29,527.

Although I have shown and described a particular form of my transmission mechanism, and have explained its operation in a particular connection for purposes of illustration, it will be understood that my invention is not restricted to the particular form herein illustrated, nor to the particular use herein described, but that it may be embodied in widely divergent forms without departing from the scope thereof, as defined in the appended claims.

I claim:—

1. In a pneumatic clock system, an air-displacing element, a driving member, and means comprising non-resilient flexible elements permanently connecting said driving member and said air-displacing element to actuate said element with gradually increasing power as the resistance to said air-displacing element increases.

2. In a pneumatic clock system, an air-displacing element, a driving member, a cam arm intermittently actuated by said driving member, and means comprising non-resilient flexible elements for operatively connecting said cam arm with said air-displacing element to actuate said element with gradually increasing power as the resistance to said air-displacing element increases.

3. In a pneumatic clock system, an air-displacing element, a driving member, an intermediate member operatively connected to said air-displacing element to actuate the same, a cam adapted to actuate said intermediate member, and a second cam arranged to be actuated intermittently by said driving member and operatively connected to said first-named cam to actuate said intermediate member with increasing power as the resistance to said air-displacing element increases.

4. In a pneumatic clock system, a plurality of air-displacing elements, a driving element, a single oscillatory lever having right-angularly disposed arms each operatively connected to one of said air-displacing elements, said connections comprising resilient power transmitting means adapted to produce positive forward strokes of said air-displacing elements and to permit full return strokes thereof, means to adjust the movements of said air-displacing elements independently of each other, and means to connect said driving element with said oscillatory lever to actuate the latter with increasing mechanical advantage as the resistance to said air-displacing elements increases.

5. In a device of the class described, an air-displacing element, an oscillatory member connected to actuate said displacing element, an intermediate member connected to said oscillatory member having a relatively large movement as compared with the movement of said oscillatory member, and means for actuating said intermediate member with increasing mechanical advantage as the resistance to said air-displacing element increases.

6. In a device of the class described, an air-displacing element, an oscillatory member connected to actuate said displacing element, an intermediate member geared to said oscillatory member having a relatively large movement as compared with the movement of said oscillatory member, and cam mechanism for actuating said intermediate member with gradually increasing mechanical advantage as the resistance to said air-displacing element increases.

7. In a pneumatic clock system, an air-displacing element, a driving element, a driven element, and means comprising resilient elements for connecting said driving element to actuate said driven element, whereby a complete operation of said driving element is permitted when a complete operation of said air-displacing element is prevented.

8. In a pneumatic clock system, an air-displacing element, and means comprising cam arms movable in opposite directions and permanently connected to said element for imparting displacing and return movements to said air-displacing element.

9. In a device of the class described, an air-displacing element, a driving element, and a yielding power transmitting connection between said driving element and said air-displacing element to permit a complete operation of said driving element when a complete operation of said air-displacing element is prevented.

10. In a device of the class described, an air-displacing element, a driven element, and means comprising two pair of cam arms connected by flexible elements for imparting displacing and return movements to said air-displacing element.

11. In a device of the class described, a driven member having a limited path of movement, an intermediate member operatively connected to said driven member and having a relatively large path of movement, a lever arm fixed on said intermediate member, a second lever arm flexibly connected to said first-named lever arm, and a driving element arranged to actuate said second-named lever arm.

12. In a device of the class described, a driven member having a limited path of movement, an intermediate member operatively connected to said driven member and having a relatively large path of movement, a pair of cam arms fixed with respect to said intermediate member, flexible elements connected to said cam arms to actuate them in opposite directions, and means to actuate said flexible elements alternately.

13. In a device of the class described, a driven member having a limited path of movement, an intermediate member operatively connected to said driven member and having a relatively large path of movement, a pair of cam arms fixed with respect to said intermediate member, flexible elements connected to said cam arms to actuate them in opposite directions, a second pair of cam arms connected to said first-named cam arms by means of said flexible elements, and means to actuate said last-named cam arms intermittently.

14. In a device of the class described, a driven member having a limited path of movement, an intermediate member operatively connected to said driven member and having a relatively large path of movement, a pair of cam arms fixed with respect to said intermediate member, flexible elements connected to said cam arms to actuate them in opposite directions, a second pair of cam arms connected to said first-named cam arms by means of said flexible elements, and a driving pin wheel adapted to engage and actuate said last-named cam arms alternately.

15. In a device of the class described, an oscillatory member having a limited arc of movement, an intermediate member having a relatively great arc of movement, a lever arm fixed with respect to said intermediate member, a second lever flexibly connected to said first-named lever, and means to actuate said second-named lever, said levers being so disposed and connected that said second-named lever will actuate said first-named lever with increasing mechanical advantage.

16. In a device of the class described, a rotary driving element, an intermediate geared sector pivotally mounted, means comprising flexibly connected cam arms for connecting said driving element with said geared sector, whereby said geared sector is actuated with increasing mechanical advantage as the movement of said driving element continues, a pivotally mounted member having a geared portion arranged to mesh with said geared sector, a lever arranged to be actuated by said pivotally mounted member, and an air-displacing element connected to said lever.

17. In a device of the class described, an operating lever, an air-displacing element, a yielding connecting device operatively connected to said lever and said air-displacing element to transmit compressive forces from said lever to said element, whereby a full return stroke of said lever is permitted when a complete operation of the air-displacing element is prevented, a driving member actuated with uniform power, and means operatively connecting said driving member with said operating lever to actuate the latter with increasing mechanical advantage as the resistance to the movement of said air-displacing element increases.

18. In a device of the class described, a rotary driving element, a pivotally mounted cam arm intermittently actuated by said driving element, a second cam arm pivotally mounted and displaced from said first-mentioned cam arm in the same plane therewith, a flexible member attached to one of said cam arms and extending over the surface of the other cam arm and attached thereto, a pivotally mounted actuating lever, connecting means forming a continuous connection between said second-named cam arm and said pivotally mounted actuating member, and an air-displacing element operatively connected to said actuating member.

In testimony whereof, I have subscribed my name.

AUGUSTUS L. HAHL

Copies of this patent may be obtained for five cents each, by addressing the "Commissioner of Patents, Washington, D. C."